US009485360B2

(12) United States Patent
Tolksdorf

(10) Patent No.: US 9,485,360 B2
(45) Date of Patent: Nov. 1, 2016

(54) CONTACT CENTER SESSION PRESERVATION

(71) Applicant: GENESYS TELECOMMUNICATIONS LABORATORIES, INC., Daly City, CA (US)

(72) Inventor: Juergen Tolksdorf, Dortmund (DE)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 402 days.

(21) Appl. No.: 13/711,463

(22) Filed: Dec. 11, 2012

(65) Prior Publication Data
US 2014/0161249 A1 Jun. 12, 2014

(51) Int. Cl.
H04M 3/00 (2006.01)
H04M 5/00 (2006.01)
H04M 3/523 (2006.01)

(52) U.S. Cl.
CPC ..... H04M 3/523 (2013.01); H04M 2203/2088 (2013.01); H04M 2203/551 (2013.01)

(58) Field of Classification Search
CPC ............. H04M 3/523; H04M 3/5238; H04M 2203/551; H04M 2203/552; H04M 3/5235
USPC ............................ 379/265.11, 266.01, 266.02
See application file for complete search history.

(56) References Cited

U.S. PATENT DOCUMENTS 5,937,051 A 8/1999 Hurd et al.
7,215,759 B2 5/2007 Brown et al.
7,701,925 B1 4/2010 Mason et al.
8,041,019 B2* 10/2011 Pieraccini et al. ....... 379/209.01
8,107,613 B2* 1/2012 Gumbula ................. 379/265.11
8,295,469 B2* 10/2012 Bushey et al. ........... 379/265.02
8,369,496 B2* 2/2013 Deshpande et al. ....... 379/88.18
8,855,292 B1* 10/2014 Brunson .................. 379/266.01
8,913,736 B2* 12/2014 Kohler et al. ........... 379/265.11
2002/0110113 A1 8/2002 Wengrovitz
2005/0089155 A1* 4/2005 Isenberg ................. 379/266.01
2006/0262921 A1 11/2006 Eppel et al.
2008/0037764 A1* 2/2008 Lee et al. ................. 379/266.01
2010/0138500 A1 6/2010 Consul et al.
2010/0158236 A1 6/2010 Chang et al.
2011/0091028 A1 4/2011 Yasrebi et al.
2012/0213341 A1* 8/2012 Jaiswal et al. ............. 379/88.01

FOREIGN PATENT DOCUMENTS

WO WO 2010/027671 A2 3/2010

OTHER PUBLICATIONS

Written Opinion and International Search Report for PCT/US2013/073752, mailed on Mar. 31, 2014, 16 pages.

* cited by examiner

Primary Examiner — Nafiz E Hoque
(74) Attorney, Agent, or Firm — Lewis Roca Rothgerber Christie LLP

(57) ABSTRACT

A system and method for handling a call made to a contact center after a prior call from the same caller was disconnected. In exemplary embodiments, a caller who was connected to an agent during the previous call may be placed in a routing path for the same agent, a caller who had provided information to the system during the previous call may not be required to provide the information again, and a caller who was in a routing path waiting for an agent may be placed ahead of other callers who have spent less time in the routing path.

27 Claims, 2 Drawing Sheets

CONTACT CENTER SESSION PRESERVATION

FIELD

The following description relates to contact centers and more particularly to a system and method for handling a call from a caller who was previously disconnected.

BACKGROUND

Contact centers may be used by an organization to communicate in an efficient and systematic manner with outside parties. Such centers may for example have large numbers of agents staffing telephones, and interacting with outside parties and with each other. Calls may be placed on hold or into an interactive voice response (IVR) server when first connected to the contact center; subsequently an agent may take a call, place it back on hold, transfer the call, conference in another agent, or take other such actions related to the call. Outside parties may also interact with a contact center by other mechanisms, including initiating contact through on-line chat, video, email, and the like.

A caller making a call to a contact center may, for example, be a consumer, and the contact center may be operated by or for a manufacturer of products, one of which the consumer has purchased, and the consumer may be calling for help in using the product. In this case, the IVR server may ask the consumer about the reason for her call, e.g., to order supplies, to get help using the product, or to return a product for repair, and the IVR server may follow up with additional questions, including questions about the type of product, the model number of the product, or the like. Once the IVR server has gathered a certain amount of information, the call may be placed in a queue, to wait for the availability of an agent employed at the contact center. After waiting in the queue, the caller may be connected to an agent, who may then provide the help the caller needs.

This process may take a significant amount of time, and during this process, there is a risk that the caller may be disconnected, or may need to disconnect, for any of a number of reasons. The caller may be interrupted by some other pressing matter, such as an urgent matter on another phone line, or a delivery man, or a colleague, or, particularly if the caller is using a mobile phone, the connection may be dropped by the telephone service. In another scenario, a call may be terminated prior to successful completion if, for example, the caller voluntarily disconnects and then realizes that she neglected to ask the agent an important question, or that the agent neglected to give her an important piece of information.

Terminating a call without successful completion may result in considerable caller frustration, as a result of the significant amount of time the caller may have invested, with little or no return. A disconnected caller may be faced with a choice of either foregoing the help she wants, or making an additional substantial investment of time, again with a risk that it may be wasted if she is disconnected.

Thus, there is a need for an improved system for handling calls disconnected prior to successful completion.

SUMMARY

An aspect of an embodiment of the present invention is directed toward the handling of a call to a contact center from a caller who had called previously and was disconnected. Such a call may be placed into a routing path specific to an agent to whom the caller talked previously, for example, or placed into a routing path at a more advanced position than a caller who had not called previously would be.

According to an embodiment of the present invention there is provided a system, including: a call history database including a stored caller identifier (CID) and a stored call status for each of one or more stored calls, the system being configured: to compare the CID of an incoming call with the stored CIDs in the call history database; and to put the call in an agent-specific routing path for an agent when at least the CID of the incoming call matches the stored CID of a stored call in the call history database and the stored call status includes an stored agent identifier identifying the agent.

In one embodiment, the system is configured to put the call in an agent-specific routing path for an agent only when a measure of the agent-specific routing path length is less than a threshold agent-specific routing path length.

In one embodiment, the measure of the agent-specific routing path length is the number of calls in the agent-specific routing path.

In one embodiment, the system is configured to put the call in an agent-specific routing path for an agent only when a caller who initiated the call has communicated a desire to return to a previous state.

In one embodiment, the measure of the agent-specific routing path length is an expected wait time in the agent-specific routing path.

In one embodiment, the system is configured to purge a stored call from the call history database when a stored call retention time has elapsed after the end of the corresponding call.

In one embodiment, the stored call retention time is configurable.

In one embodiment, the stored call retention time is two minutes.

In one embodiment, the system includes a general routing path, wherein the system is configured to place the call in the general routing path when the stored call status does not include a stored agent identifier.

In one embodiment, the system is configured to place the call in the general routing path at a position corresponding to a time-in-routing-path of the stored call when the CID of the incoming call matches the stored CID of a stored call in the call history database.

In one embodiment, the system is configured to place the call in the general routing path at a location depending on the category of the caller.

In one embodiment, the system is configured to place the call in the general routing path at a location depending on the category of the call.

In one embodiment, the system is configured to provide a stored call status to an agent receiving an incoming call when the CID of the incoming call matches the stored CID of a stored call in the call history database.

In one embodiment, the system is configured to provide a stored call status to an agent receiving an incoming call by providing to the agent the stored call status in a screen pop.

According to an embodiment of the present invention there is provided a method, including: receiving a first call associated with a first CID; storing, in a call history database, the first CID; storing, in the call history database, stored call status for the first call; receiving a second call associated with a second CID; comparing the first CID and the second CID; and placing the second call in an agent-specific routing path for an agent when at least the first CID matches the second CID and the stored call status for the first call includes a stored agent identifier identifying the agent.

In one embodiment, the method includes placing the second call in the agent-specific routing path for the agent only when a measure of the agent-specific routing path length is less than a threshold agent-specific routing path length.

In one embodiment, the measure of the agent-specific routing path length is the number of calls in the agent-specific routing path.

In one embodiment, the measure of the agent-specific routing path length is an expected wait time in the agent-specific routing path.

In one embodiment, the method includes placing the second call in the agent-specific routing path for the agent only when a caller who initiated the call has communicated a desire to return to a previous state.

In one embodiment, the method includes purging the first CID and the stored call status for the first call from the call history database when a stored call retention time has elapsed after the end of the first call.

In one embodiment, the stored call retention time is configurable.

In one embodiment, the stored call retention time is two minutes.

In one embodiment, the method includes placing the second call in a general routing path when: the first CID matches the second CID; and the stored call status for the first call does not include a stored agent identifier.

In one embodiment, the placing of the second call in the general routing path includes placing the second call in the general routing path at a position corresponding to a time-in-routing-path of the stored call status for the first call.

In one embodiment, the placing of the second call in the general routing path includes placing the second call in the general routing path at a location depending on the category of the caller.

In one embodiment, the placing of the second call in the general routing path includes placing the second call in the general routing path at a location depending on the category of the call.

In one embodiment, the method includes providing a stored call status to an agent receiving an incoming call when the CID of the incoming call matches the stored CID of a stored call in the call history database.

In one embodiment, the providing of the stored call status to the agent includes providing the stored call status to the agent in a screen pop.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of a system and method for contact center session preservation provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
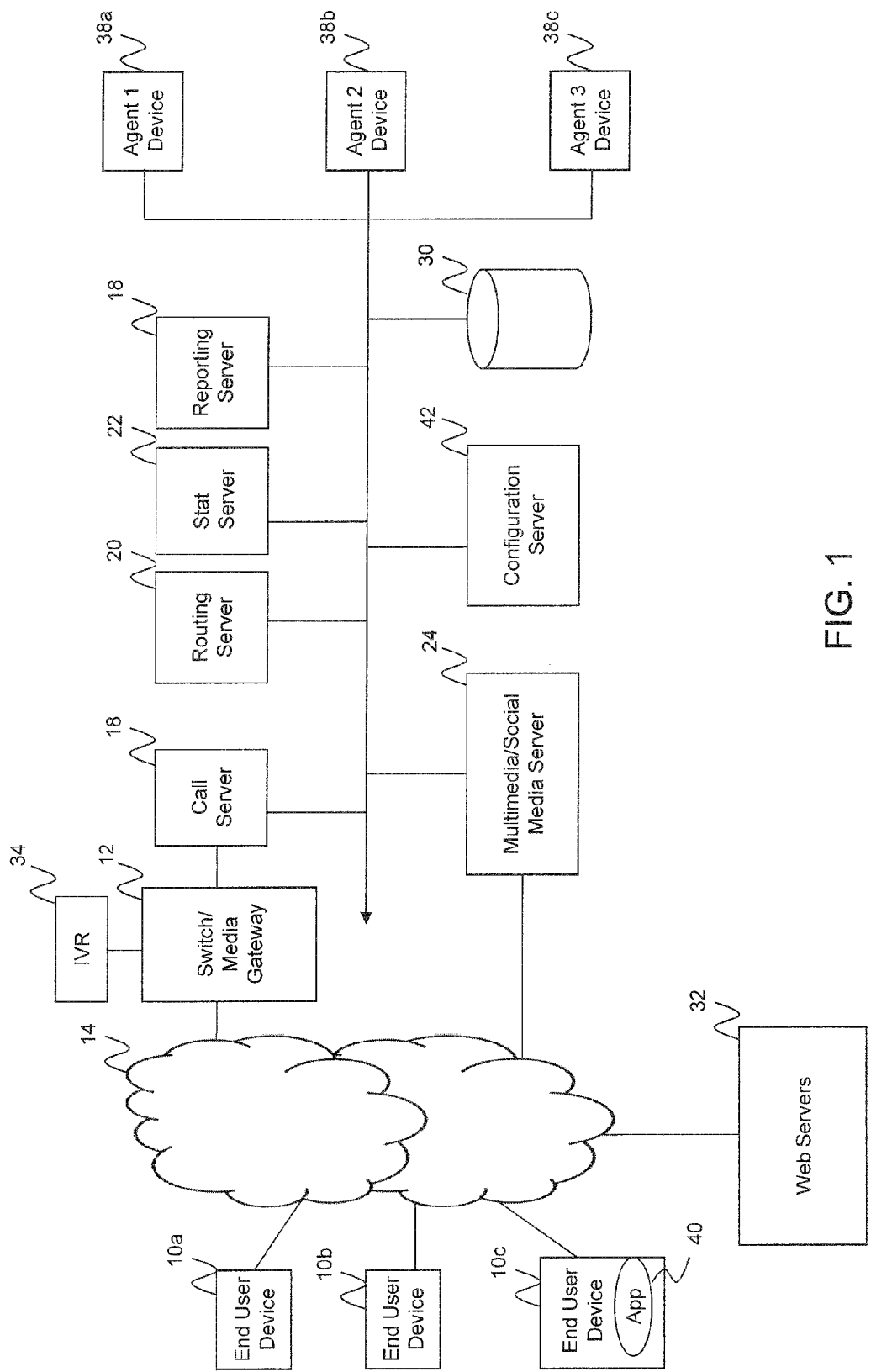
FIG. 1 is a block diagram of elements in an exemplary contact center according to an exemplary embodiment of the present invention.

FIG. 1 is a schematic block diagram of a system supporting a contact center according to one exemplary embodiment of the invention. The contact center may be an in-house facility to a business or corporation for serving the enterprise in performing the functions of sales and service relative to the products and services available through the enterprise. In another exemplary embodiment, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as end users) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. The mechanisms of contact in a call, and the corresponding user devices 10, need not be limited to real-time voice communications as in a traditional telephone call, but may be non-voice communications including text, video, and the like, and may include email or other non-real-time means of communication. Thus the term "call" as used herein is not limited to a traditional telephone call but is a generalized term including any form of communication in which a contact center may participate.

Inbound and outbound calls from and to the end user devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls and/or data between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch/media gateway 12 and the remainder of the routing, monitoring, and other call-handling systems of the contact center.

The contact center may also include a multimedia/social media server 24, which may also be referred to as an interaction server, for engaging in media interactions other than voice interactions with the end user devices 10 and/or web servers 32. The media interactions may be related, for example, to email, chat, text-messaging, web, social media, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive voice response (IVR) server 34. IVR is a technology that allows a computer to interact with humans through the use of voice and dual-tone multi-frequency (DTMF) tones input via keypad. In telecommunications, IVR allows customers to interact with a contact center via a telephone keypad or by speech recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions. In one exemplary embodiment, the IVR server 34 is configured, for example, with an IVR script for querying customers on their needs. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

Although in one exemplary embodiment interactions between the caller and the IVR may be by voice and DTMF input, the present invention is not limited thereto. The IVR may, for example, exchange text with the caller, if the caller has access to a text input or text output device such as a computer or a device with Short Message Service (SMS) capabilities. The IVR may also, for example, play video or music for the caller, or display images or text to the caller, and receive communications from the caller corresponding to other caller interfaces, such as mouse clicks. As such, as used herein, the term interactive voice response (IVR) refers not only systems based on voice interactions, but includes any system, using any mechanism of communication, in which a caller may interact with an automated system.

In one exemplary embodiment, if the call is to be routed to an agent, the call is forwarded to the call server 18 which interacts with a routing server 20 for finding the most appropriate agent for processing the call. The call server 18 may be configured to process PSTN calls, VoIP calls, and the like. For example, the call server 18 may include a session initiation protocol (SIP) server for processing SIP calls. In another exemplary embodiment, the call server may include a telephony server (T-server).

In one example, while an agent is being located and until such agent becomes available, the call server may place the call in a routing path. This routing path may be a mechanism for storing calls temporarily, and in one exemplary embodiment it may have the structure or behavior of a queue, or first in, first out (FIFO) structure. The routing path may be implemented via any data structure conventional in the art, such as, for example, a linked list, array, and/or the like. The data structure may be maintained, for example, in buffer memory provided by the call server 18.

Once an appropriate agent is available to handle a call, the call is removed from the routing path and transferred to the corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations. The selection of an appropriate agent for routing an inbound call may be based, for example, on a routing strategy employed by the routing server 20, and further based on information about agent availability, skills, and other routing parameters provided, for example, by a statistics server 22, which may also be referred to as a stat server 22. A person of skill in the art should recognize that the stat server 22 may also be implemented via firmware (e.g. an application-specific integrated circuit), hardware, or a combination of software, firmware, and hardware.

The multimedia/social media server 24 may also be configured to provide, to an end user, a mobile application 40 for downloading onto the end user device 10. The mobile application 40 may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center may also include a reporting server 28 configured to generate reports from data aggregated by the stat server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

To store configuration information such as device characteristics and agent attributes, such as agent skill levels, a configuration server 42 may be included in the system. The configuration server 42 may, for example, provide attribute values for objects or processes when these are created, at system startup, or subsequently.

According to one exemplary embodiment of the invention, the contact center also includes a call history database 30 for storing data related to received calls, including information provided by the caller through the IVR 34, or while interacting with an agent. The contact center may also store other information related to contact center operations such as, for example, information related to agents, hardware configurations, and the like, in one or more separate databases or in the same database housing the call history database 30.

Each of the various servers of FIG. 1 may include one or more processors executing computer program instructions and interacting with other system components for performing the various functionalities described herein. The computer program instructions are stored in a memory which may be implemented in the server using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the exemplary embodiments of the present invention.

Figure 2:
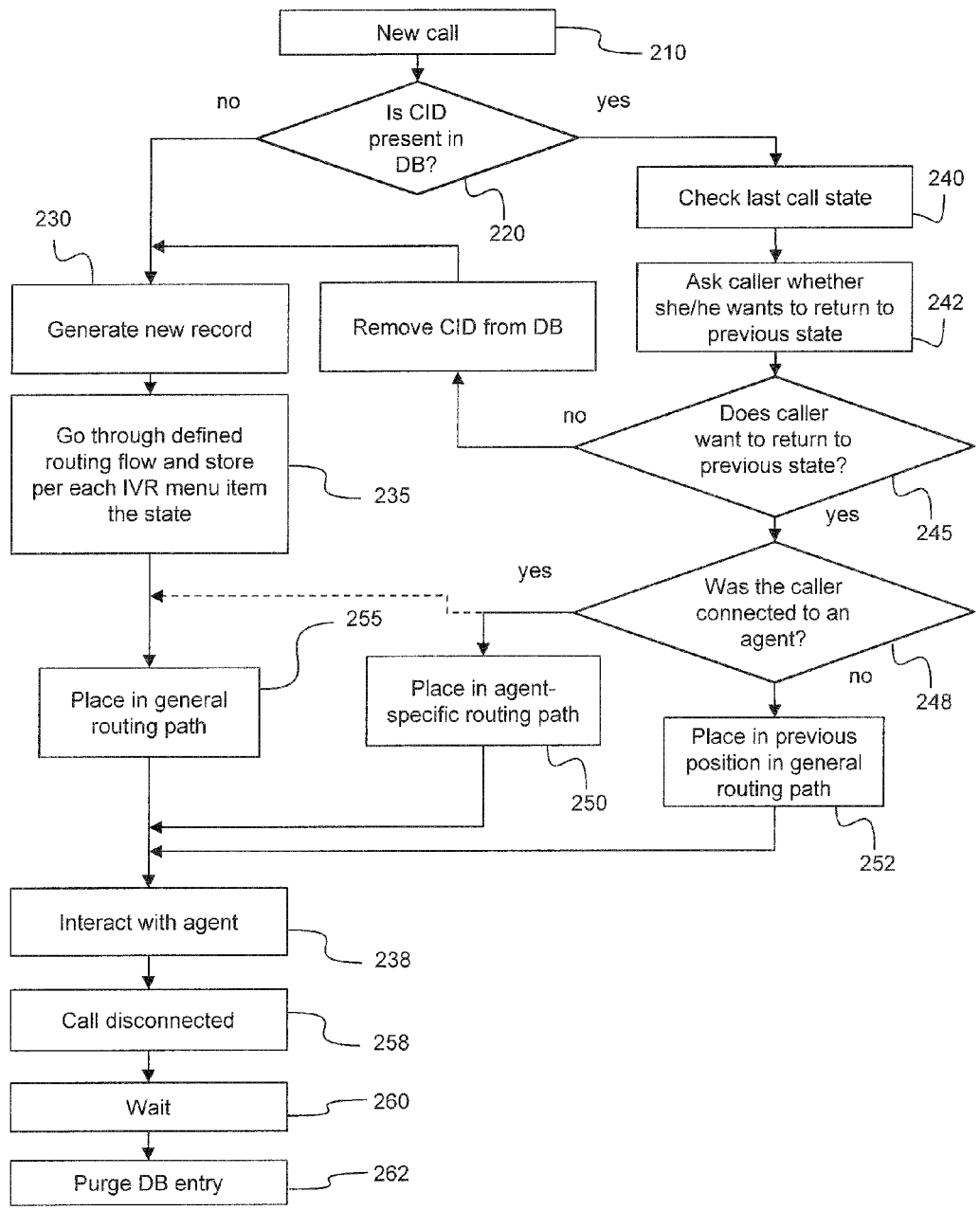
FIG. 2 is a flow chart showing acts engaged in, in the handling of a call according to an exemplary embodiment of the present invention.

In an exemplary embodiment of the present invention, features of the invention are provided by the IVR 34, the call server 18, the routing server 20, and the call history database 30. Referring to FIG. 2, when a call is first received, in a first act 210, the contact center may receive information identifying the origin of the call, which may be referred to as a caller identifier (CID). For example, a CID may be, or include, an automatic number identification (ANI). As used herein, the CID may include the phone number from which the call was placed, if the call is a conventional telephone call, or it may include other identifying information such as a device identifying number or a subscriber identification number such as an international mobile subscriber identity (IMSI) for a telephone, or an Ethernet address of Media Access Control (MAC) address if the call is a voice or non-voice call connected through the Internet. A CID may also be, or include, identifying information the caller provides when she calls, such as an account number. A CID may, for example, be a unique customer number assigned to a person by the contact center operator, and which may be associated, by the customer, or by the contact center based on past contacts, with one or more ANIs, MAC addresses, or other identifiers.

In an act 220, the contact center may determine whether the CID for the call is already in the call history database 30 ("DB"). If the CID is not in the call history database 30, a new record may be generated in the call history database 30 in an act 230, and various pieces of information may be added to this record, as, in an act 235, the caller interacts with the IVR server, and provides responses to prompts produced by the IVR server. This information related to the call, which supplements the CID in the call history database 30, may collectively be referred to as the stored call status. For example, if the caller is a consumer, then product information may be added to the call history database 30, as well as the reason for the caller's call.

In one exemplary embodiment, the IVR may play an advertisement, or provide other information, in the form of video, voice, text, music, or the like, to the caller, and ask the caller whether she would be interested in purchasing an advertised product or service, or receive additional information about a product or related products. In such an exemplary embodiment, the fact that the advertisement has been shown to the caller may be stored in the call history database 30 as part of the stored call status, as well as the caller's response, so that it will be possible in the future to avoid showing the same advertisement to the caller, and to respond to any expression of interest.

While, in an act 255, the caller is waiting in a routing path to be connected to an agent, the amount of time the caller has spent in the routing path may be stored in the call history database 30 and updated periodically as the caller continues to wait in the routing path. This element of the stored call status may be referred to as the stored time-in-routing-path. Advertising or other information may also be communicated to the caller while the call is in the routing path, and this fact, as well as any response elicited from the caller, may become part of the stored call status. Once the caller is connected to an agent, information identifying the agent, which may be referred to as an agent identifier, may be added to the call history database 30, to become an element of the stored call status which may be referred to as the stored agent identifier. In an act 238, the caller may then interact with the agent.

If, in act 220, it is determined that the CID is in the call history database 30, the system may infer that the caller called previously. The contact center may then, in an act 240, read the stored call status from the call history database 30 and, in an act 242, ask the caller whether she would like to return to the state in which she was at the time of being disconnected. For example, if the call history database 30 indicates that the caller had called seven minutes earlier about an appliance with model number A370, and had been waiting for an agent, the IVR server may ask the caller, "Our records indicate that you called seven minutes ago about your A370 appliance and were waiting for an agent. Would you like to return to your place in the queue?" In another exemplary embodiment, if the stored call status indicates that during the previous call the caller had navigated partway through a complex IVR tree, the system will, if the caller so desires, place the caller back at the same place in the tree and restore all of the information, such as a product serial number, the caller may have already provided.

In one exemplary embodiment, if, in an act 245, the caller indicates that she does want to return to the previous state, then the system may accomplish this in two ways, depending, in an act 248, on whether the caller was already connected to an agent when the previous call ended. If the caller was previously connected to an agent, then in an act 250, the call may be placed in a routing path specific to that agent, which may be referred to as an agent-specific routing path. The system may also allow an agent, after interacting with the caller, to recommend another agent as best suited for handling the call if the caller calls back. For example a first agent may speak with the caller and then be abruptly disconnected, when the caller's phone battery runs out, for example. Aware that the same caller may shortly try to call again, and possibly aware that a second agent is better qualified to assist the caller, the first agent may add to the stored call status instructions that upon calling back the caller should be routed to the second agent. Other relevant information, such as the reason for the call, or product identifying information, may also be added to the stored call status by the first agent if it is not already stored as a result of the caller's interaction with an IVR. If there is no preferred agent identified in the stored call status, the call may, in an act 252, be placed in a routing path serviced by a group of agents, which may be referred to as a general routing path.

After a call is, in an act 258, disconnected, the system may, in an act 260, wait a set or predetermined amount of time which may be referred to as the stored call retention time, before purging, in an act 262, the information accumulated for the call, e.g., the stored CID and the stored call status, from the call history database 30. In one embodiment, the stored call retention time is configurable by the operator of the contact center. In one exemplary embodiment, the stored call retention time is two minutes. This purging act 262 reduces the data storage requirements that the call history database 30 must meet, and insures that if the caller calls back at some later date, she will not be asked about an earlier call, which may no longer be relevant and which she may have forgotten.

The processes which participate in the acts described above and illustrated in FIG. 2 may execute, in one exemplary embodiment, on the IVR 34, the call server 18, and the routing server 20, or, in other exemplary embodiments, these processes may execute on other servers, including those shown in FIG. 2 (e.g., the stat server 22). The processes need not all execute on one server, but may be distributed over multiple servers.

Various suitable approaches may be used in the contact center for managing the general routing path and the agent-specific routing paths. If, in act 248, it is determined that the caller was previously connected to an agent, but the agent-specific routing path for that agent exceeds a threshold agent-specific routing path length, the call may instead be placed in the general routing path, as indicated by the dashed line in FIG. 2, either at the end of the general routing path or at some position nearer the front of the routing path. In one embodiment, the threshold agent-specific routing path length is configurable by the contact center operator. The measure of agent-specific routing path length may be the number of calls in the agent-specific routing path, or the expected wait time in the agent-specific routing path. A call may also be removed from an agent-specific routing path and placed in the general routing path if, for example, a call occupying an agent takes longer than anticipated, or if the agent becomes unavailable, her shift having ended, for example. In one embodiment, the threshold agent-specific routing path length is one call. If the caller had previously been placed in the general routing path and, in act 248, it is determined that the caller was not previously connected to an agent, then the call may be placed in the general routing path, at a location corresponding to the stored time-in-routing-path. In an exemplary embodiment, the placement of a call in a routing path, or the removal of a call from a routing path and the connection of the call to an agent, may be performed by an entity or process, within the contact center, referred to as a router. The router may, in one exemplary embodiment, be a process instantiated in or by the routing server.

Routing paths in the contact center may be implemented in various suitable ways. In one exemplary embodiment, a routing path may be implemented as a first in, first out (FIFO) structure, e.g., a sequence of storage locations, together with a pointer identifying the front of the routing path and a pointer identifying the last position in the routing path. In this case, an agent who has just become available to take a call may take the call at the front of the routing path, causing the corresponding pointer to be advanced to point to the next location in the routing path. In such an embodiment if, as for example in act 252, a call is to be placed at a position other than the last position in the routing path, other calls in the routing path may need to be rearranged. Moreover, there may be obstacles to placing a call back in the routing path if, for example, that last position has advanced entirely out of the routing path.

In another embodiment, calls or pointers to calls may instead be stored in a different data structure which may be referred to as a pool, and which may be implemented as an array, a linked list, a hash table, or the like. The process for assigning a call to an agent who has just become available may involve searching the pool of calls to identify the call with the highest priority. When the pool is accessed in this manner, the routing path acts as a queue if, for example, the priority of each call is periodically increased, so that the call which has been in the pool longest has the highest priority. In one embodiment, this periodic updating of the priority of each call occurs every thirty seconds. In such an embodiment, if a caller waits nearly long enough to be connected to an agent, is disconnected and then calls back, the caller may be given a correspondingly high priority, so that the effect is that of moving the call to the front of the routing path.

An agent-specific routing path may thus be implemented by assigning to certain calls a higher priority for a particular agent than other similarly situated calls. In this case, being placed in an agent-specific routing path need not guarantee that a call will eventually be routed to the corresponding agent, but may merely increase the likelihood that this will occur. Moreover, the degree to which a particular agent is best suited to take a particular call may vary continuously, between, at one extreme, a circumstance in which the particular agent is only slightly better suited to take the call than other agents, to, at the other extreme, a circumstance in which only the particular agent may take the call. In another exemplary embodiment, a particular agent, who may have previously had an unfavorable interaction with a caller, may be less well suited than other agents to take a call, and the call may be placed in an agent-specific routing path associated with a preference against, e.g., a reduced likelihood of, the call being routed to the particular agent. Thus, as used herein, an agent-specific routing path refers to any routing path associated with a preference for, or against, a particular agent.

In such an exemplary embodiment, other factors may also be used to influence the length of time a caller may be required to wait before being connected to an agent. For example, the call center may classify callers into categories such as blue members, premium members, gold members, or platinum members, in order of increasing value to the organization. For a business using a contact center, for example, a platinum member may be one who spent more than a certain threshold amount purchasing goods or services from the business during the past year. Platinum members who call in may then be given a priority level that is ten points higher, for example, than gold members, when they are placed in the pool, assuring the platinum members shorter hold times.

In one embodiment, a separate FIFO may be implemented for each priority level, e.g., the routing path may be implemented as a pool of FIFOs, to accommodate the possibility that multiple calls may have the same priority. In one embodiment, the system may classify calls into categories based on the purpose of the call, and the category of the call may affect the call priority, with, for example, calls from callers who wish to make a purchase being given higher priority.

In one exemplary embodiment information provided by the caller to the agent may also be stored in the call history database 30, and retrieved if the caller calls again. For example, a caller may be in the middle of a banking transaction (e.g., transferring funds between accounts), when she is disconnected. In such a situation, when the caller calls again, the contact center may prompt the caller for suitable authenticating information, such as a personal identification number, and then restore the partially completed transaction, including for example account numbers and the amount of money to be transferred, from the call history database 30. In one exemplary embodiment, when a caller is reconnected to an agent after having been disconnected, information relevant to the call may be displayed to the agent in a screen pop, e.g., a window or dialog box that autonomously appears on the desktop.

In some situations, certain types of CID may not be sufficient to identify a caller reliably. An outside telephone system may be set up, for example, so that all outgoing calls originating from any telephone in the system have the same ANI. In such a case, the contact center may be pre-programmed to recognize such ANIs, or it may learn to recognize them from a history of interacting with callers from such ANIs, and it may resort to other mechanisms, such as asking callers for a customer or account number, to identify such callers.

Although exemplary embodiments of a system and method for contact center session preservation have been specifically described and illustrated herein, many modifications and variations will be apparent to those skilled in the art. Accordingly, it is to be understood that a system and method for contact center session preservation constructed according to principles of this invention may be embodied other than as specifically described herein. The invention is also defined in the following claims, and equivalents thereof.

What is claimed is:

1. A call handling system for a contact center, the system comprising:
    a processor;
    a memory, wherein the memory has stored thereon instructions that, when executed by the processor, cause the processor to:
        instantiate an interactive voice response (IVR) tree having a plurality of places, and a queue having a plurality of places,
        maintain a call history database including, for each of one or more stored calls:
            a stored customer identifier (CID); and
            a stored call status, wherein the stored call status contains an indication of whether an advertisement was communicated to a caller associated with the stored call;
        determine, based on comparing a CID of an incoming call to the stored CIDs in the call history database, whether the incoming call is a continuation of a previously interrupted stored call;
        in response to determining that the incoming call is a continuation of a previously interrupted stored call:
            determine whether the previously interrupted stored call was interrupted while associated with a place in the tree or in a place in the queue;
            in response to determining that the previously interrupted stored call was interrupted while associated with a place in the tree, associate the incoming call with the place in the tree;
            in response to determining that the previously interrupted stored call was interrupted while associated with a place in the queue, associate the incoming call with the place in the queue;
            determine, based on the indication in the call status that the advertisement was communicated to the caller; and
            in response to determining that the advertisement was communicated to the caller, refrain from communicating the advertisement during the incoming call; and
    a switch coupled to the processor, the switch configured to route the incoming call to a contact center resource.

2. The system of claim 1, wherein the instruction further cause the processor to:
    instantiate, for each of a plurality of agents, an agent-specific queue corresponding to the agent;
    determine whether the previously interrupted stored call was interrupted while associated with an agent of the plurality of agents; and
    in response to determining that the previously interrupted stored call was interrupted while associated with an agent of the plurality of agents, associate the incoming call with the agent-specific queue corresponding to the agent.

3. The system of claim 2, wherein the instructions further cause the processor to:
    determine whether the agent-specific queue length is less than a threshold agent-specific queue length, and
    in response to determining that the agent-specific queue length is less than a threshold agent-specific queue length, associate the incoming call with the agent-specific queue corresponding to the agent.

4. The system of claim 3, wherein the measure of the agent-specific queue length is the number of calls in the agent-specific queue.

5. The system of claim 3, wherein the measure of the agent-specific queue length is an expected wait time in the agent-specific queue.

6. The system of claim 2, wherein the instructions further cause the processor to:
    in response to determining that the previously interrupted stored call was interrupted while associated with an agent of the plurality of agents:
        determine, by prompting a caller associated with the incoming call, whether the caller wants to return to the agent; and
        in response to determining that the caller wants to return to the agent, associate the incoming call with the agent-specific queue corresponding to the agent.

7. The system of claim 1, wherein the instructions further cause the processor to purge a stored call from the call history database when a stored call retention time has elapsed after the end of a call corresponding to the stored call.

8. The system of claim 7, wherein the stored call retention time is configurable.

9. The system of claim 7, wherein the stored call retention time is two minutes.

10. The system of claim 1, wherein the instructions further cause the processor to:
    instantiate a general queue, and
    associate the incoming call with the general queue in response to determining that the incoming call is not a continuation of a previously interrupted stored call.

11. The system of claim 10, wherein the instructions further cause the processor to associate the incoming call with the general queue at a place depending on a value of a caller associated with the incoming call.

12. The system of claim 10, wherein the instructions further cause the processor to associate the incoming call with the general queue at a place depending on the category of the incoming call.

13. The system of claim 1, wherein the instructions further cause the processor to provide a stored call status to an agent receiving the incoming call when the CID of the incoming call matches the stored CID of a stored call in the call history database.

14. The system of claim 13, wherein the instructions further cause the processor to provide a stored call status to an agent receiving the incoming call by providing to the agent the stored call status in a screen pop.

15. The system of claim 1, wherein the instructions further cause the processor to:
in response to determining that the incoming call is a continuation of a previously interrupted stored call:
retrieve, from the call history database, stored call status for the previously interrupted stored call; and
associate, with the incoming call, the retrieved call status.

16. The system of claim 1, wherein the instruction further cause the processor to:
in response to determining that the previously interrupted stored call was interrupted while associated with a place in the queue:
determine, by prompting a caller associated with the incoming call, whether the ca r wants to return to the place in the queue; and
in response to determining that the caller wants to return to the place in the queue, associate the incoming call with the place in the queue.

17. A method for handling calls in a contact center, the method comprising:
instantiating, by a processor, an interactive voice response (IVR) tree having a plurality of places, and a queue having a plurality of places,
maintaining a call history database including, for each of one or more stored calls:
a stored customer identifier (CID); and
a stored call status, wherein the stored call status contains an indication of whether an advertisement was communicated to a caller associated with the stored call;
determining, based on comparing a CID of an incoming call to the stored IDs in the call history database, whether the incoming call is a continuation of a previously interrupted stored call;
in response to determining that the incoming call is a continuation of a previously interrupted stored call:
determining whether the previously interrupted stored call was interrupted while associated with a place in the tree or in a place in the queue;
in response to determining that the previously interrupted stored call was interrupted while associated with a place in the tree, associating the incoming call with the place in the tree;
in response to determining that the previously interrupted stored call was interrupted while associated with a place in the queue, associating the incoming call with the place in the queue;
determine, based on the indication in the call status that the advertisement was communicated to the caller and
in response to determining that the advertisement was communicated to the caller, refrain from communicating the advertisement during the incoming call; and
routing, by a switch coupled to the processor, the incoming call to a contact center resource.

18. The method of claim 17, further comprising:
in response to determining that the incoming call is a continuation of a previously interrupted stored call:
retrieving, from the call history database, stored call status for the previously interrupted stored call; and
associating, with the incoming call, the retrieved call status.

19. The method of claim 17, further comprising:
in response to determining that the previously interrupted stored call was interrupted while associated with a place in the queue:
determining, by prompting a caller associated with the incoming call, whether the caller wants to return to the place in the queue; and
in response to determining that the caller wants to return to the place in the queue, associating the incoming call with the place in the queue.

20. The method of claim 17, further comprising:
instantiating, for each of a plurality of agents, an agent-specific queue corresponding to the agent;
determining whether the previously interrupted stored call was interrupted while associated with an agent of the plurality of agents; and
in response to determining that the previously interrupted stored call was interrupted while associated with an agent of the plurality of agents, associating the incoming call with the agent-specific queue corresponding to the agent.

21. The method of claim 20, further comprising:
determining whether the agent-specific queue length is less than a threshold agent-specific queue length, and
in response to determining that the agent-specific queue length is less than a threshold agent-specific queue length, associating the incoming call with the agent-specific queue corresponding to the agent.

22. The method of claim 21, wherein the measure of the agent-specific queue length is the number of calls in the agent-specific queue.

23. The method of claim 21, wherein the measure of the agent-specific queue length is an expected wait time in the agent-specific queue.

24. The method of claim 20, further comprising:
in response to determining that the previously interrupted stored call was interrupted while associated with an agent of the plurality of agents:
determining, by prompting a caller associated with the incoming call, whether the caller wants to return to the agent; and
in response to determining that the caller wants to return to the agent, associating the incoming call with the agent-specific queue corresponding to the agent.

25. The method of claim 17, further comprising purging a stored call from the call history database when a stored call retention time has elapsed after the end of a call corresponding to the stored call.

26. The method of claim 25, wherein the stored call retention time is configurable.

27. The method of claim 25, wherein the stored call retention time is two minutes.

* * * * *